United States Patent [19]

Patel et al.

[11] 4,349,363
[45] Sep. 14, 1982

[54] FILTER ELEMENT LEDGE GASKET

[75] Inventors: Jhina Patel, Eastlake; Terry L. Zahuranec, Hudson, both of Ohio

[73] Assignee: Incom International Inc., Pittsburgh, Pa.

[21] Appl. No.: 200,794

[22] Filed: Oct. 27, 1980

[51] Int. Cl.³ .................. B01D 27/04; B01D 46/02
[52] U.S. Cl. ......................... 55/498; 55/499; 55/502; 55/510; 210/450; 210/484; 210/493.2
[58] Field of Search .................. 55/498–499, 55/502, 509–510, 356; 210/450, 493.2, 484

[56] References Cited

U.S. PATENT DOCUMENTS

| | | | |
|---|---|---|---|
| 2,943,699 | 7/1960 | Thornburgh | 55/498 X |
| 3,235,633 | 2/1966 | Holloway et al. | 55/502 X |
| 3,616,618 | 11/1971 | Gronholz et al. | 55/502 X |

FOREIGN PATENT DOCUMENTS

| | | | |
|---|---|---|---|
| 210672 | 8/1960 | Austria | 55/498 |
| 247074 | 5/1966 | Austria | 55/510 |

*Primary Examiner*—Kathleen J. Prunner
*Attorney, Agent, or Firm*—James C. Wray

[57] ABSTRACT

A filter element has a filter medium positioned between concentrically spaced cylindrical walls. A semiflexible, urethane ledge gasket has an annular seal portion that sealingly engages one end of the walls and filter medium and an edge of a generally circular retainer plate that closes one end of the filter element. An annular gripper surface extends inwardly from the seal portion and is spaced axially from the outer surface of the retainer plate so as to provide a finger gripping surface so that the filter element can be removed from its housing. An annular lip extends outwardly from the seal portion to engage an end of the housing.

12 Claims, 5 Drawing Figures

U.S. Patent      Sep. 14, 1982      4,349,363
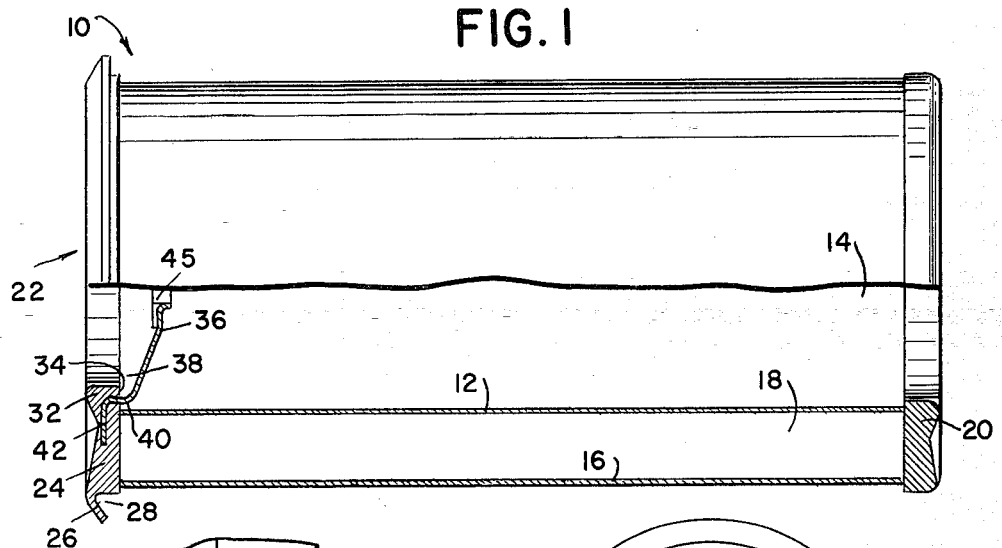
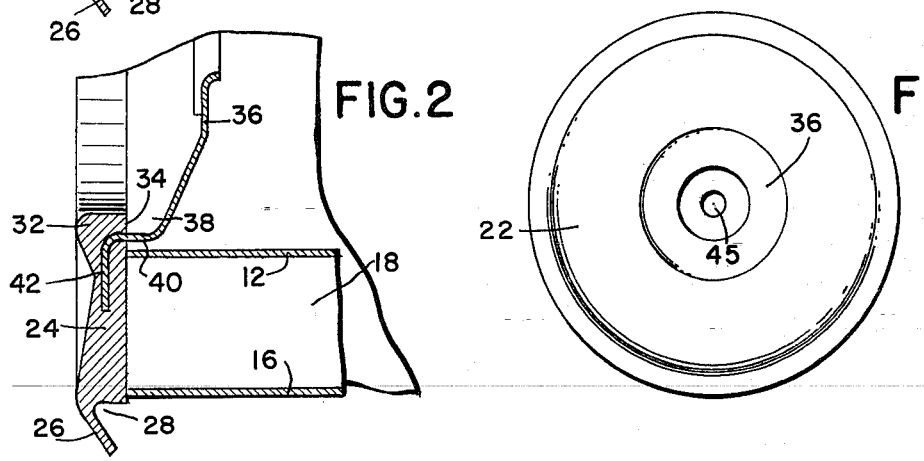
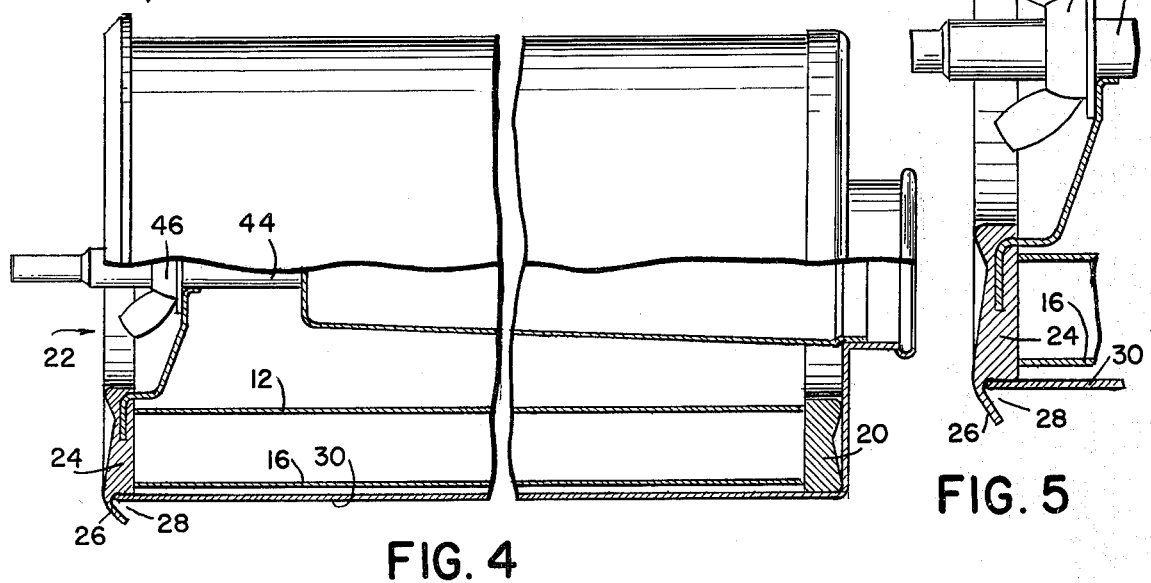

FILTER ELEMENT LEDGE GASKET

BACKGROUND OF THE INVENTION

This invention relates generally to gaskets and more particularly as reference to a ledge gasket adapted for use in a filter element.

Examples of pertinent patents are U.S. Pat. Nos. 4,128,251; 4,056,876; 3,877,910; 3,399,516; 2,871,976 and 2,732,031.

U.S. Pat. No. 4,128,251 discloses a sealing gasket for an air filter. The gasket, preferably made of plastisol, has a soft base portion that provides a seal between the gasket and the filter medium.

In U.S. Pat. No. 4,056,876, a hot-melt adhesive is used to attach a rim to a filter element. A tight seal is formed when the adhesive is cured.

U.S. Pat. No. 3,877,910 discloses an air cleaner designed to withstand the impact of an automobile collision. The cleaner has inner and outer casings. The outer casing gives upon impact, but the inner casing, formed of stronger material, resists. The retainer does not form a filter medium seal.

U.S. Pat. No. 3,399,516 discloses two molded vinyl gaskets used to form a seal between the filter element and metal retaining piece.

U.S. Pat. No. 2,871,976 discloses a filter element used in an air-cleaner intake silencer. Two end caps, preferably formed of thermoplastic material, are molded to the ends of a filter medium. These caps form an air-tight seal with the filter medium and thus act as gaskets.

U.S. Pat. No. 2,732,031 discloses a seal and gasket combination used in an air filter. A molded piece is heat-treated and then allowed to cool while in contact with the paper element. The cooled piece acts as a seal and a gasket.

The prior art gaskets and seals proved generally adequate in sealing the end of the filter element itself. However, a second gasket was needed to provide a water seal between the filter element and the housing into which the element was inserted. That gasket was often fixed to the outer surface of a metal end retainer used to secure the filter element in the housing.

Means was also needed for facilitating removal of a used filter element from the housing. Generally, a metal plate or rim was welded to the metal end retainer for that purpose. The plate or rim had no sealing function.

The need for three separate pieces, i.e., a filter element seal, an element-to-housing water seal, and a finger grip for removal, resulted in high manufacturing costs and an unreliable and unwieldy product.

SUMMARY OF THE INVENTION

The present invention overcomes many of the problems which exist in the prior art devices. The present invention incorporates the filter element seal, the element-to-housing water seal and the finger grip in a unitary ledge gasket. The ledge gasket of the present invention has an annular seal portion that sealingly engages ends of the filter element walls. An annular lip extends outwardly from the seal portion into engagement with the filter housing, thereby providing a water seal between the filter element and the housing. The metal end retainer used to secure the filter element in the housing is embedded in the ledge gasket. An annular portion of the gasket extends inwardly and is spaced axially from the outer surface of the retainer plate to provide a finger grip surface.

An object of the invention is, therefore, to provide an improved seal for a filter element.

Another object of the invention is to provide an improved filter element seal capable of performing several different and distinct functions. Yet another object of the invention is to provide a filter element seal which eliminates the need for a separate element-to-housing water seal and a separate finger grip in a filter assembly.

Still another object of the invention is to provide a ledge gasket for use in a filter element comprising an annular seal portion configured to extend across the space between the inner and outer walls of the filter element and sealingly engage ends of those walls and a retainer plate, an annular lip extending outwardly from the seal portion, and an annular gripper portion extending inwardly from the seal portion, the inner surface of the gripper portion being spaced axially outwardly from the outer surface of the retainer plate.

Another object of the invention is to provide a gasket adapted for use in a filter element wherein the annular seal portion, the annular lip portion, and the annular gripper portions of the gasket are formed integrally of semi-flexible urethane.

These and other and further objects and features of the invention are apparent in the disclosure which includes the above and below specification and claims and drawings.

BRIEF DESCRIPTION OF THE DRAWINGS

FIG. 1 is a side elevational view, partly in section, of a filter element incorporating the features of the present invention.

FIG. 2 is a sectional detail of a portion of the filter element shown in FIG. 1.

FIG. 3 is a top plan view of the filter element shown in FIG. 1.

FIG. 4 is a side elevational view, partly in section, of a filter assembly incorporating the features of the present invention.

FIG. 5 is a sectional detail of a portion of the filter assembly shown in FIG. 4.

DETAILED DESCRIPTION OF THE DRAWINGS

A filter element embodying the features of the present invention is indicated generally by the numeral 10.

The filter element 10 has an inner cylindrical wall 12 which defines an axial cavity 14. An outer cylindrical wall 16 is concentrically spaced about the inner cylindrical wall 12. Both walls 12 and 16 are provided with openings which allow the filtrate to pass through the space between the walls 12 and 16. Preferably, the inner wall 12 is an expanded metal cylinder and the outer wall 16 is a perforated metal cylinder.

A filter medium 18 is positioned in the space between walls 12 and 16. The filter medium 18 can be of any of the conventional filter materials known in the art. Preferably, the filter medium 18 is paper.

The space between the walls 12 and 16 is sealed at both ends of the filter element 10. A conventional plastisol seal 20 is used at one end. The ledge gasket of the present invention, indicated generally by the numeral 22, is used at the opposite end.

The ledge gasket 22 has an annular seal portion 24 which sealingly engages the ends of the walls 12 and 16. Filter medium 18 adjacent to those wall ends is also sealingly engaged by the seal portion 24. That configuration prevents unwanted matter from entering the space between the walls 12 and 16.

An annular lip 26 projects outwardly from the seal portion 24. The space 28 formed between the inner surface of the lip 26 and outer surface of the seal portion 24 is designed to receive the end of a filter element housing 30. The relationship between the lip 26 and the filter element housing 30 is best shown in FIG. 5. The lip 26 prevents water and other undesirable elements from seeping into the space between the filter element 10 and the filter element housing 30.

An annular finger grip 32 extends inwardly from the seal portion 24. The finger grip 32 has an inner surface 34 which is spaced axially from the outer surface of a metal end retainer 36. The space 38 between the finger grip 32 and the retainer 36 is large enough to accommodate a fingertip. With this arrangement, a user can easily remove the filter element 10 from its housing 30 by placing his finger on the inner surface 34 of the finger grip 32 and pulling the filter element 10 toward himself.

The ledge gasket 22 is preferably a molded unitary element. It can be formed of semi-flexible urethane.

The metal end retainer 36 is a generally circular plate used to secure the filter element 10 in the filter element housing 30. The outer edge of the retainer 36 is embedded in the ledge gasket 22. Preferably, the outer edge of the retainer 36 has an axial portion 40 which is spaced inwardly from the inner wall 12 and which extends into the ledge gasket 22 and a radial portion 42 which is ' spaced axially from the ends of the walls 12 and 16 and which terminates outwardly about midway between the walls 12 and 16.

When in use, the filter element 10 is customarily secured within a housing 30. A filter element and housing assembly incorporating the features of the present invention is best shown in FIG. 4. The housing 30 is a cylindrical case designed to accommodate the filter element 10. A threaded spindle 44 is mounted in the housing 30 projects through an opening 45 in the retainer 36 when the filter element 10 is placed in the housing 30. A wing nut 46 is screwed onto the spindle 44 to secure the filter element 10. A user can withdraw the filter element 10 from the housing 30 by removing the wing nut 46 from the spindle 44, placing his finger tip under the inner surface 34 of the finger grip 32, and pulling the filter element 10 toward himself.

While the invention has been described with reference to a specific embodiment, the exact nature and scope of the invention is defined in the following claims.

What is claimed is:

1. In a filter element having an end retainer plate, an inner wall defining an axial cavity, an outer wall concentrically spaced about the inner wall, and a filter medium positioned between the inner and outer walls, the improvement comprising a gasket, said gasket comprising an annular seal portion configured to extend across the space between the inner and outer walls and sealingly engage ends of the walls and retainer plate, an annular lip extending outwardly from the seal portion and having an axially inward surface configurated to sealingly engage an edge of a housing receiving the filter element, and an annular gripper portion extending inwardly from the seal portion and being spaced axially from the outer surface of the retainer plate to form a space between said gripper portion and the retainer plate sufficient to accommodate a fingertip.

2. The filter element of claim 1 wherein
    the annular seal portion, the annular lip, and the annular gripper portion are formed of semi-flexible urethane.

3. The filter element of claim 1 wherein
    the annular seal portion, the annular lip, and the annular gripper portion are formed integrally.

4. The filter element of claim 1 wherein
    the annular seal portion, the annular lip, and the annular gripper portion are formed integrally of semi-flexible urethane.

5. The filter element of claim 1 wherein
    the annular seal portion is further configured to sealingly engage an end of said filter medium adjacent ends of the walls.

6. The filter element of claim 1 wherein the annular lip extends radially outwardly and axially inwardly.

7. The filter element of claim 1 wherein the annular lip extends radially outwardly and axially inwardly from the axially outward end of the seal portion to form a space between the inner surface of the lip and the outer surface of the seal portion for receiving said edge of the housing.

8. In a filter element having an end retainer plate, an inner wall defining an axial cavity, an outer wall concentrically spaced about the inner wall, and a filter medium positioned between the inner and outer walls, the improvement comprising a gasket, said gasket comprising an annular seal portion configured to extend across the space between the inner and outer walls and sealingly engage ends of the walls and retainer plate, an annular lip extending outwardly from the seal portion, and an annular gripper portion extending inwardly from the seal portion and being spaced axially from the outer surface of the retainer plate, wherein the end of the retainer plate has a radial portion which is embedded in the seal portion and which extends at least partially across the space between the inner and outer walls.

9. The filter element of claim 8 wherein the radial portion of the retainer plate terminates outwardly about midway between the inner and outer walls.

10. The filter element of claim 8 wherein the radial portion of the retainer plate is spaced axially from the ends of the inner and outer walls.

11. The filter element of claim 8 wherein the end of the retainer plate further has an axial portion which is at least partially embedded in the annular seal portion.

12. The filter element of claim 11 wherein the axial portion is spaced inwardly from the inner wall.

* * * * *